(12) United States Patent
Scheele et al.

(10) Patent No.: US 7,882,914 B2
(45) Date of Patent: Feb. 8, 2011

(54) OPERATOR PLATFORM ISOLATION SYSTEM

(75) Inventors: William D. Scheele, Odell, NE (US); Mike Strimple, Liberty, KS (US); Troy Thompson, Coffeyville, KS (US)

(73) Assignee: Husqvarna Professional Outdoor Products Inc., Beatrice, NE (US)

( * ) Notice: Subject to any disclaimer, the term of this patent is extended or adjusted under 35 U.S.C. 154(b) by 607 days.

(21) Appl. No.: 11/623,582

(22) Filed: Jan. 16, 2007

(65) Prior Publication Data

US 2008/0202874 A1 Aug. 28, 2008

Related U.S. Application Data

(60) Provisional application No. 60/670,761, filed on Jan. 19, 2006.

(51) Int. Cl.
*B62D 33/077* (2006.01)

(52) U.S. Cl. .................................. 180/89.14; 280/89.12

(58) Field of Classification Search ............. 180/89.12, 180/89.13, 89.14, 900; 280/124.179; 56/15.8, 56/15.7
See application file for complete search history.

(56) References Cited

U.S. PATENT DOCUMENTS

| | | | | |
|---|---|---|---|---|
| 3,288,523 A | | 11/1966 | Bollden et al. | |
| 3,446,527 A | | 5/1969 | Persson | |
| 3,732,941 A | * | 5/1973 | Davis et al. | 180/89.1 |
| 3,783,594 A | | 1/1974 | Watt et al. | |
| 3,784,219 A | * | 1/1974 | Van Der Burgt et al. | 280/104 |
| 4,076,302 A | * | 2/1978 | Sable | 296/65.06 |
| 4,311,204 A | * | 1/1982 | Shupert | 180/54.1 |
| 4,452,328 A | * | 6/1984 | Oudelaar | 180/89.14 |
| 5,037,155 A | | 8/1991 | Holm et al. | |
| 5,127,699 A | | 7/1992 | Maezawa et al. | |
| 5,367,864 A | | 11/1994 | Ogasawara et al. | |
| 5,799,475 A | | 9/1998 | Borling et al. | |
| 5,876,085 A | | 3/1999 | Hill | |
| 5,946,893 A | * | 9/1999 | Gordon | 56/15.8 |
| 6,460,318 B1 | | 10/2002 | Ferris et al. | |
| 6,499,282 B1 | | 12/2002 | Velke et al. | |
| 6,711,885 B2 | * | 3/2004 | Ferris | 56/15.8 |
| 6,773,049 B2 | | 8/2004 | Rupiper et al. | |
| 6,857,254 B2 | * | 2/2005 | Melone et al. | 56/15.8 |
| 2003/0024223 A1 | | 2/2003 | Jager et al. | |
| 2004/0244348 A1 | * | 12/2004 | Ferris | 56/15.8 |
| 2005/0127631 A1 | | 6/2005 | Schaffner | |

OTHER PUBLICATIONS

International Search Report dated Oct. 3, 2007 in reference to international application No. PCT/US07/01174.

* cited by examiner

*Primary Examiner*—Paul N Dickson
*Assistant Examiner*—Drew Brown
(74) *Attorney, Agent, or Firm*—Pearne & Gordon LLP

(57) ABSTRACT

A vehicle for terrain travel includes a chassis, an operator platform including space for footing, a first isolation mechanism and a second isolation mechanism operably connected between the chassis and the operator platform. The isolation mechanisms are to be placed either below, above or level with the operator platform and at substantially opposite edges of the operator platform. Each isolation mechanism at least partially absorbs motion from the chassis. The isolation mechanisms may be made up of telescopic members, a biasing member or a dampening device. One of the isolation mechanisms may provide pivotal coupling of the operator platform to the chassis and at least partially absorb motion from the chassis.

20 Claims, 10 Drawing Sheets

OPERATOR PLATFORM ISOLATION SYSTEM

RELATED PATENT APPLICATION

Benefit of priority is claimed from U.S. Provisional Patent Application No. 60/670,761, filed Jan. 19, 2006.

FIELD OF INVENTION

This present invention relates to a suspension system for at least partially isolating an operator platform from the motion of a vehicle chassis.

BACKGROUND OF THE INVENTION

An operator of a vehicle traveling on the ground may experience a bumpy ride due to the unevenness of a terrain. The vehicle may transmit the motion arising from the rise and fall of the wheels directly to the operator. To resolve such a problem, certain vehicles are equipped with suspension systems. A conventional suspension system, as shown in U.S. Pat. No. 6,460,318 to Ferris et al., operates by providing a chassis that floats relative to the wheels so that the chassis will be at least partially isolated from the movement of the wheels. However, such suspension systems still cause significant motion of the chassis which in turn is experienced by the operator. Other devices, such as one disclosed in U.S. Pat. No. 5,037,155 to Holm et al., attempt to reduce the transmission of motion by installing a suspension system that spans the base of an operator seat. However, the motion of the vehicle may still be felt by the operator through the legs which feel the movement of the chassis. Thus, there is a need to further isolate the operator from the motion of the chassis and to provide a smoother ride than is realized by existing suspension systems.

SUMMARY OF THE INVENTION

In accordance with one aspect of the invention, a vehicle for terrain travel comprises a chassis, an operator platform including space for footing, and a first isolation mechanism and a second isolation mechanism operably connected between the chassis and the operator platform. The isolation mechanisms are to be placed below, above or level with the platform and at substantially opposite borders of the operator platform. Each isolation mechanism at least partially absorbs motion from the chassis and at least one of the isolation mechanisms couples the operator platform to the chassis.

In accordance with another aspect of the present invention, a vehicle for terrain travel comprises a chassis, an operator platform and an isolation mechanism between the chassis and the operator platform. The isolation mechanism is placed near one edge of the operator platform and performs the dual functions of pivotally coupling the operator platform to the chassis and at least partially absorbing motion from the chassis.

DESCRIPTION OF EXAMPLE EMBODIMENTS

Figure 1:
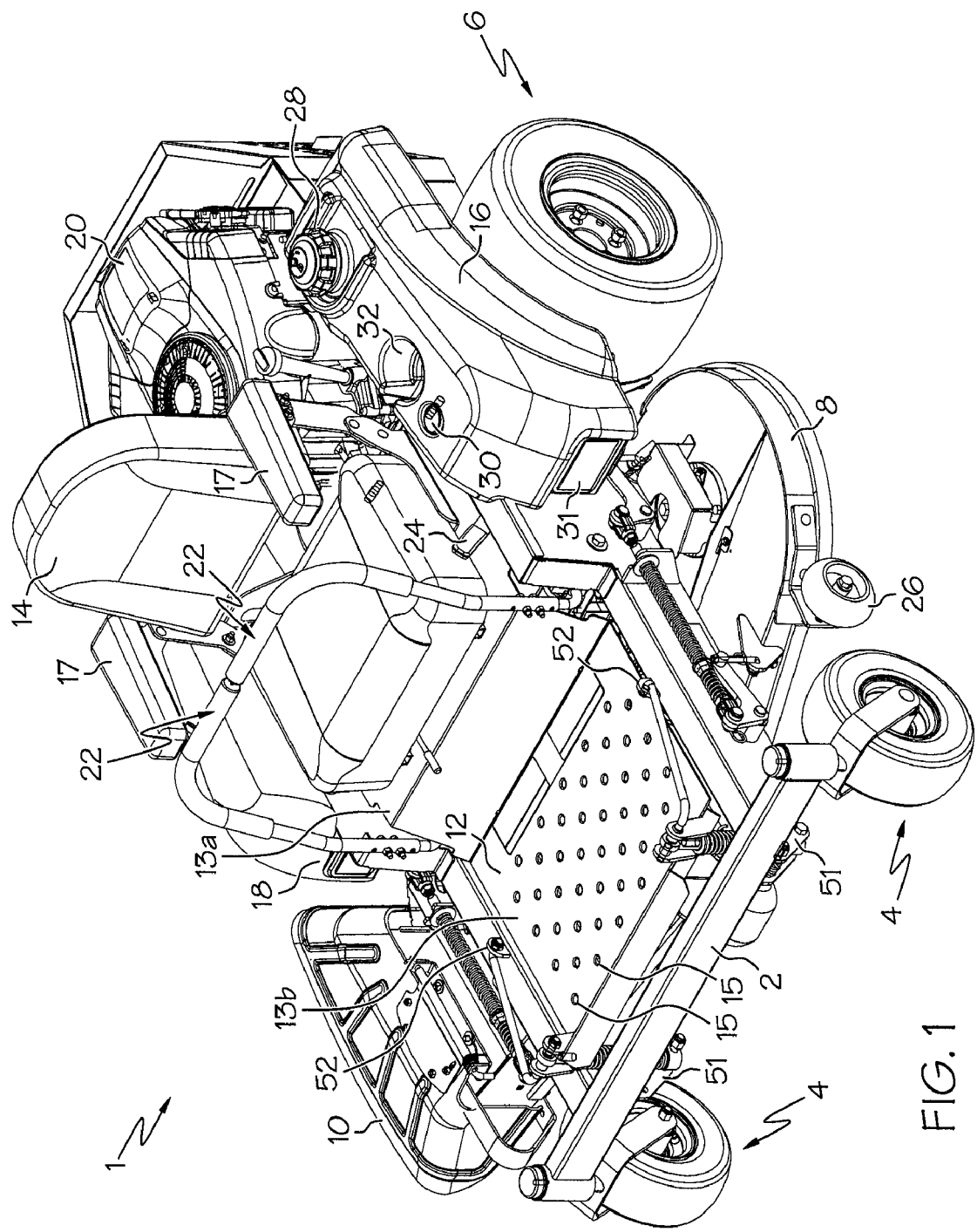
FIG. 1 is a perspective view of a vehicle with an operator platform isolation system as part of one embodiment of the present invention.

The present invention will now be described referring to a number of example embodiments shown in the drawings where like numerals refer to like elements. It is to be appreciated that the embodiments are shown for illustration only and that the limitations of the embodiments should not be considered as defining the bounds of the present invention.

The present invention may be found in any type of vehicle that travels in contact with the surface of a terrain. Such a vehicle will commonly travel the terrain by way of wheels but vehicles using other means such as continuous chain treads (i.e., caterpillar), ski-like parts or any combination of the above mentioned means can also benefit from the present invention. Thus, the present invention is applicable to means of travel such as riding mowers, golf carts, harvesters, all-terrain vehicles, snowmobiles and jet skis.

FIG. 1 shows an engine-propelled lawn mower 1 with wheels. The mower 1 shown is a transmission steer or zero turn radius mower that can pivot as it turns and, compared to a mower operated through a conventional steering wheel mechanism, results in less uncut grass over which the mower must pass again. The major components of the mower in FIG. 1 are a chassis 2, front wheels 4, rear wheels 6, a cutting deck 8, a deflector shield 10, an operator platform 12, an operator seat 14, a left wheel housing 16, a right wheel housing 18 and an engine 20.

In the embodiment shown in FIG. 1, the front wheels 4 are caster wheels that are free to rotate about a vertical axis while the rear wheels 6 drive the mower 1 and are operably connected to a transmission (not shown) and the engine 20 mounted to the rear of a chassis 2. The present invention can be implemented on mowers with different wheel arrangements such as a mower having rear drive wheels and steerable front wheels or a mower having traction and steering drive wheels mounted to the chassis such that the rear of the chassis may be supported by one or more free caster wheels and a front mounted deck may be supported by one or more free caster wheels. The transmission steer mower is equipped with steering levers 22 in front of the operator to control turning. Pushing a lever rotates the wheel on that particular side of the lever in a forward direction while pulling the lever rotates the wheel in a rearward direction. A hand brake 24 is located to the left of the operator seat 14. It is to be appreciated that the implementation of the present invention is not limited to transmission steer mowers but also applies to all types of riding mowers as well as other types of vehicles.

In the embodiment of FIG. 1, the cutting deck 8 is connected to the bottom of the chassis 2 and is hauled by the forward movement of the chassis 2. The cutting deck 8 travels the terrain on anti-scalping rollers 26 and houses a cutter (not shown) that is powered by the engine 20. Although the cutting deck 8 is located directly underneath the chassis 2, the present invention is compatible with alternative locations of the cutting deck 8. The cutter may also be operably connected to a collector to which grass will be channeled after they are cut. The engine 20 is mounted at the rear of the chassis 2 behind the operator seat 14. A fuel tank (not shown) is found adjacent to the engine 20 inside the left wheel housing 16 with a fuel cap 28 at the top. The wheel housings 16, 18 can also be equipped with a fuel gauge 30, a headlight 31, a cupholder 32 and other mower control devices such as a throttle lever. In a mower operated by a conventional steering wheel mechanism, the engine 20 is often located at the front end of the chassis 2 but the present invention can still be implemented on a chassis 2 with varying arrangements of the engine 20 and other components.

Figure 2:
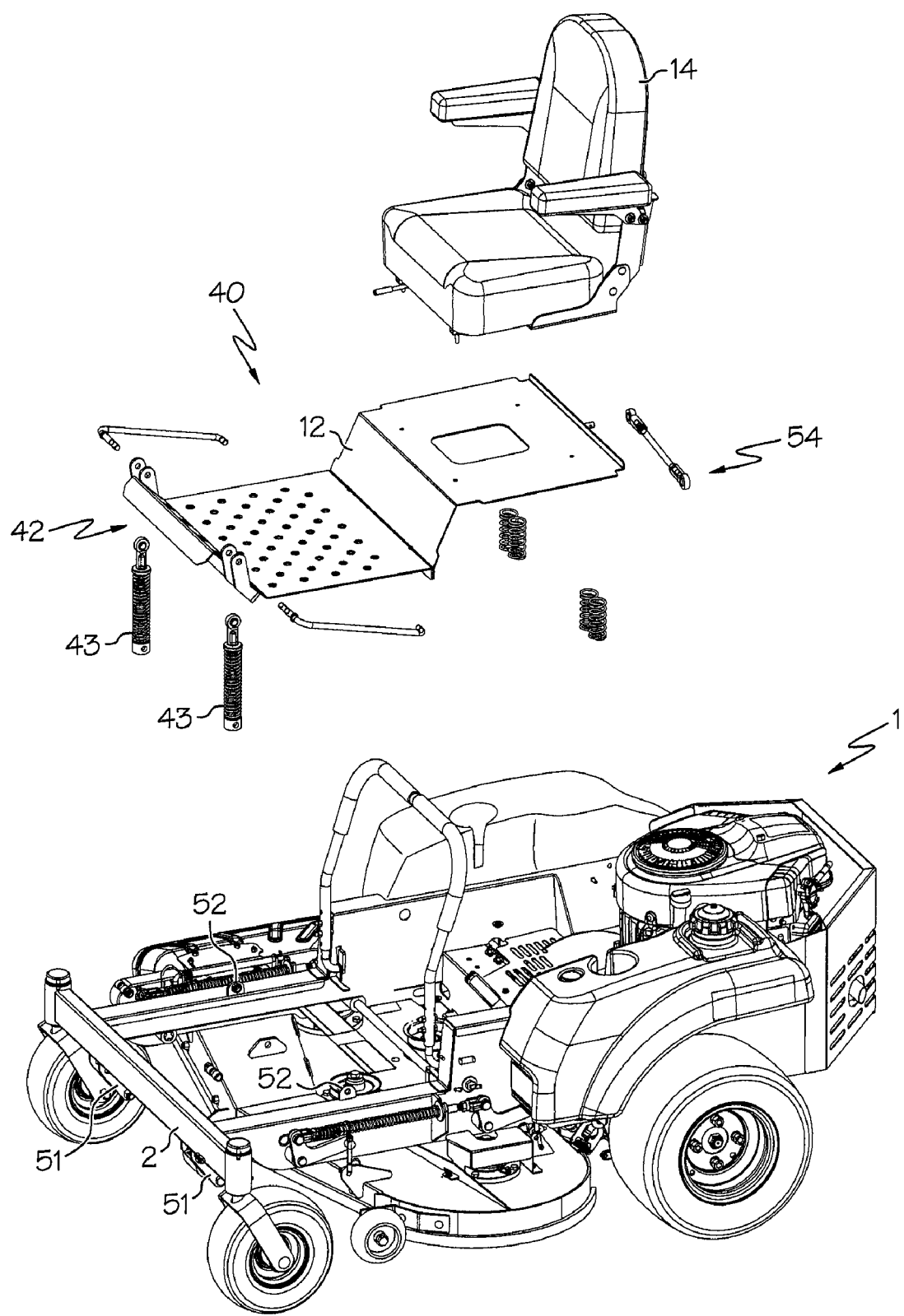
FIG. 2 is an exploded view of the vehicle with the operator platform isolation system as part of one embodiment of the present invention.

The present invention is applicable to any ground traveling vehicle with the operator platform 12 comparable to that of FIGS. 1 and 2. The operator platform 12 lies over a substantial portion of the chassis 2 unoccupied by the engine 20. The operator platform 12 provides a foundation, distinct from the chassis 2 and the operator seat 14, on which all of the operator's weight can rest. In this regard, a platform without an operator seat 14 would qualify as an operator platform 12 if it provided a foundation on which the operator could place one's feet or stand. Furthermore, the operator platform 12 can be substantially planar or take on a variety of shapes such as the substantially stepped structure of FIG. 3. The general plane of the operator platform 12 can also be substantially tilted or horizontal. The embodiment of FIGS. 2 and 3 provides a stepped platform 12 where the operator can either be seated or standing and where the operator seat 14 is mounted on an upper area 13a of the stepped operator platform 12. If the operator chooses to stand, he or she can stand by placing his or her feet on a lower area 13b of the stepped operator platform 12. As shown in FIG. 1, the lower area 13b of the foundation has a plurality of perforations 15 for discarding dirt or grass. The operator seat 14 may be attached fixedly on top of the operator platform 12 or may be isolated from the motion of the operator platform 12 by way of biasing members or dampening devices. As shown in FIG. 1, the operator seat 14 is also equipped with armrests 17 and the hand brake 24 and the steering levers 22 are easily within the reach from the operator seat 14. The steering levers 22 can be swiveled sideways to allow the operator to take a seat or to lift the operator platform 12. The swiveling of the steering levers 22 also may function as a safety feature for starting operation of the mower 1.

Figure 3A:
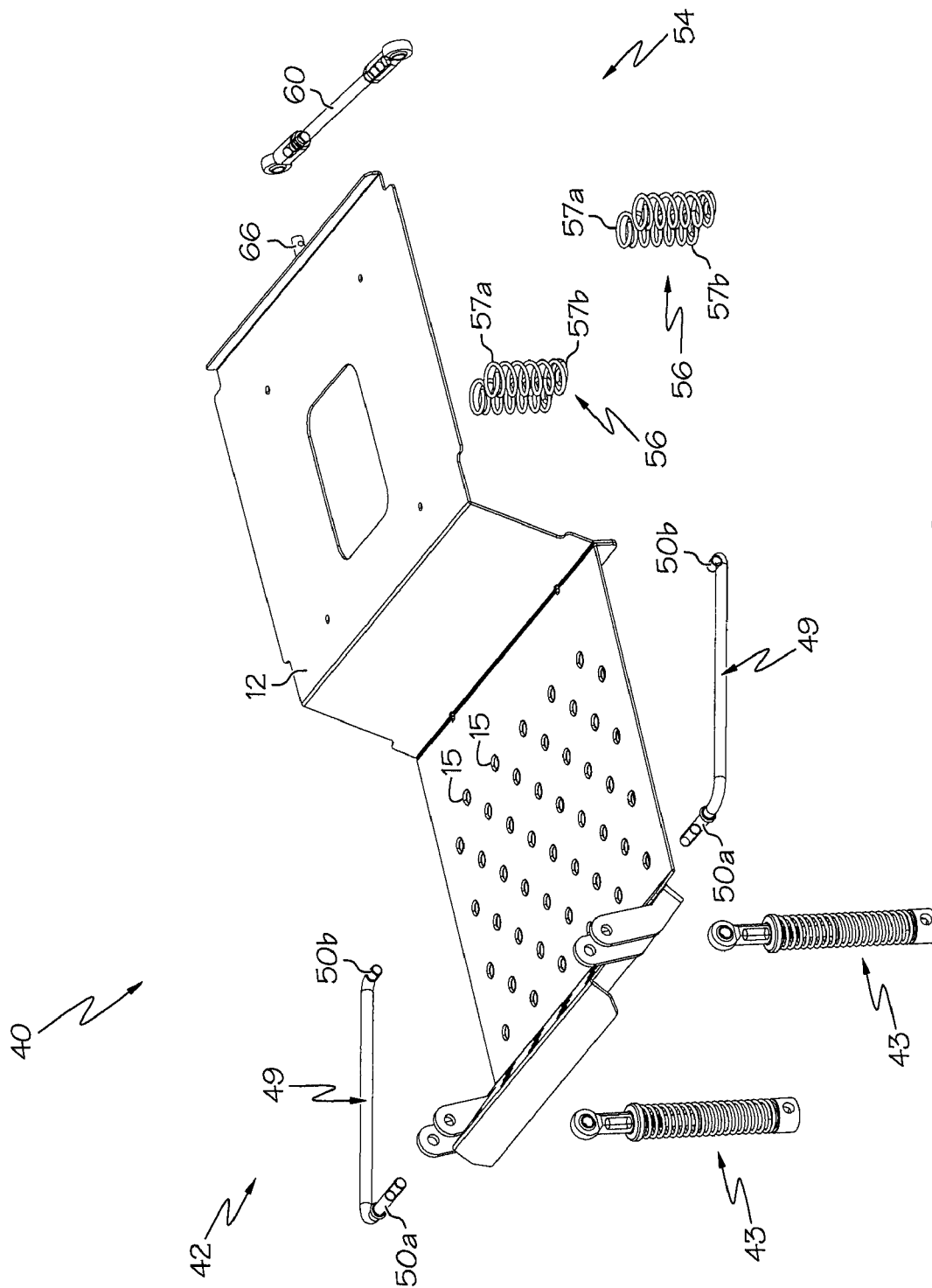
FIG. 3A is an exploded view of the operator platform isolation system showing a front isolation mechanism and a rear isolation mechanism as part of one embodiment of the present invention.

FIGS. 2 and 3A show one embodiment of the present invention in which the operator platform 12 is connected to the chassis 2 through a set of isolation mechanisms. In this embodiment, an operator platform isolation system 40 is made up of a front isolation mechanism 42 and a rear isolation mechanism 54 as shown in FIG. 3A. Each isolation mechanism is operably connected between the chassis 2 and the operator platform 12 and contributes to isolating the operator platform 12 from the motion of the chassis 2 that is caused as the wheels 4, 6 move over uneven terrain. However, it is to be appreciated that, even though the isolation mechanisms 42 and 54 are operably connected between the chassis 2 and the operator platform 12, their locations may be either below, level with, or even above the operator platform 12 in appearance. In the embodiment shown in FIGS. 3A and 3B, the front isolation mechanism 42 is made up of two isolating members 43 that are made up of telescopic members 44a, 44b and a biasing member 45 that intervenes the telescopic members 44a, 44b. The telescopic members 44 are coaxial tubes of distinct diameters with overlapping sections that are designed to slide relative to one another extending or compressing the overall length of the cylinder-like isolating member 43 that is formed. The biasing member 45, such as a coil spring, intervenes in that it is held in place between flanges 46a, 46b of the telescopic members 44a, 44b. The telescopic members 44a, 44b and the biasing member 45 are of such dimensions that the length of overlapping portion of the telescopic members 44a, 44b would be greater had it not been for the presence of the biasing member 45 between the telescopic members 44a, 44b. At the outer ends 47a, 47b of the cylinder-like isolating member 43, the telescopic members 44a, 44b have apertures 48a, 48b for pivotally coupling ring-shaped ends 47a, 47b to the chassis 2 and the operator platform 12. As shown in FIGS. 1, 2, 4 and 5, the lower end 47b of the isolating member 43 of the front isolation mechanism 42 is pivotally coupled to joints 51 of the chassis 2 via bolt and nut. The upper end 47a of the isolating member 43 of the front isolation mechanism 42 is pivotally coupled to the operator platform 12 through a rotating bar 49 that is perpendicularly bent at the outer ends 50a, 50b. The rotating bar 12 has a front end 50a and a rear end 50b both of which are threaded to accept nuts. As shown in FIGS. 1, 4 and 5, the front end 50a of the rotating bar 49 pivotally couples the front isolation mechanism 42 to the operator platform 12 while a rear end 50b of the rotating bar 49 is pivotally coupled to joints 52 of the chassis 2.

Figure 3C:
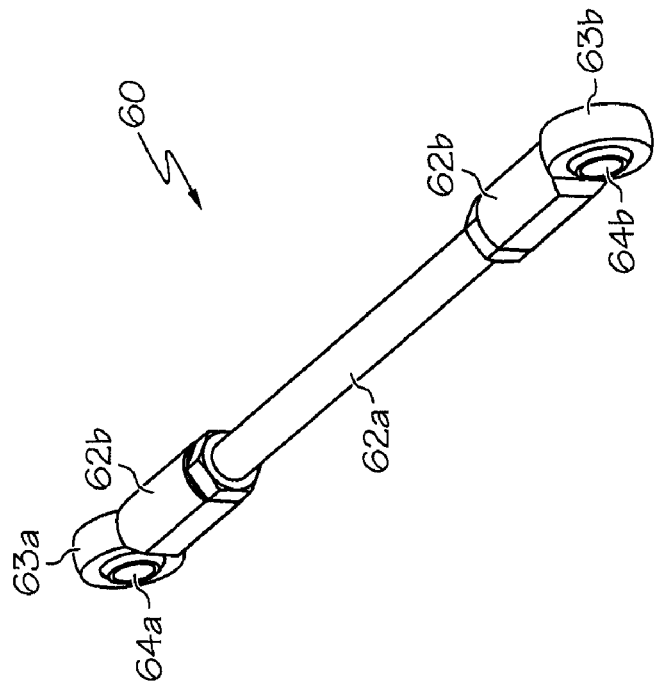
FIG. 3C is a perspective view of a stabilizing bar of the rear isolation mechanism as part of one embodiment of the present invention.
Figure 3B:
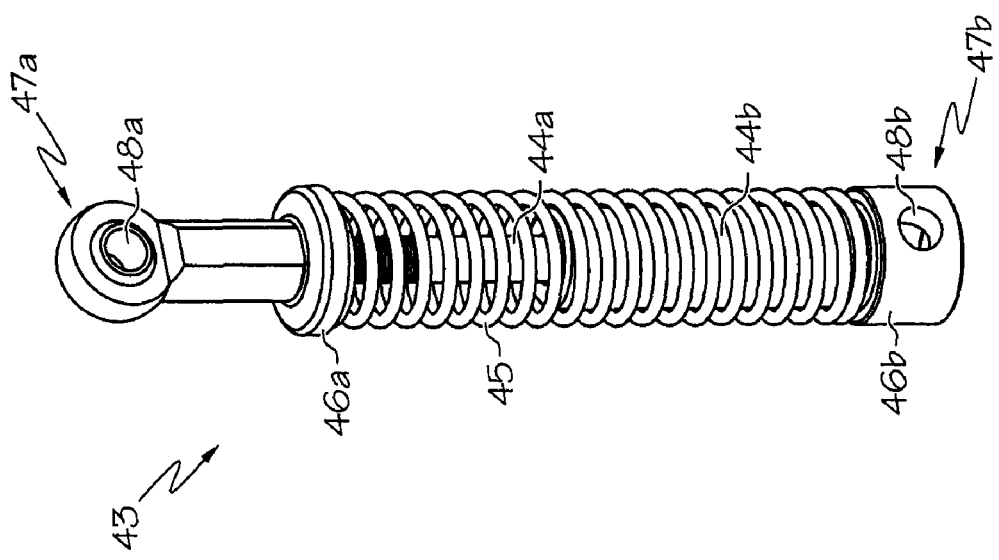
FIG. 3B is a perspective view of an isolating member of the front isolation mechanism as part of one embodiment of the present invention.

FIGS. 2 and 3A also show the rear isolation mechanism 54 that is made up of two sets of two adjacent biasing members 56, such as coil springs, all of which are in a substantially linear configuration and a stabilizer bar 60. In this embodiment, the lower ends 57b of the biasing members 56 are fixedly secured to the chassis 2 as shown in FIG. 4 via bolt and nut. The upper ends 57a of the biasing members 56 simply support the lower surface of the operator platform 12 while freely moving against it. However, it is possible to contemplate a rear isolation mechanism 54 where one end of a biasing member 56 is coupled to either the operator platform 12 or the chassis 2 while the other end simply contact the other or is coupled to the other. The stabilizer bar 60, shown in FIG. 3C, is made up of telescopic members 62a, 62b and may include an intervening biasing member or a dampening device within the telescopic members 62a, 62b. The stabilizer bar 60 has two ring-shaped ends 63a, 63b that contain ball-and-socket joints 64a, 64b where an inner end 63a of the stabilizer bar 60 is pivotally coupled to a threaded protrusion 66 at the rearmost end of the operator platform 12 while an outer end 63b is pivotally coupled to the chassis 2. The stabilizer bar 60 can change its length and adjust to the vertical and horizontal movement of the operator platform 12. It is to be appreciated that other variations of the rear isolation mechanism 54 are within the scope of the present invention. Such variations include, among other things, a rear isolation mechanism made up of isolating members that are any combination of telescopic members, an intervening biasing member and an intervening dampening device instead of the present embodiment where biasing members and telescopic members are installed away from one another. Moreover, variations of the ends 63a, 63b of the stabilizer bar 60 include, among other things, loose tolerance pinned joints or other cheaper, conventional linkage connections such as a rubber ISO-mount or a plastic bushing.

It is to be appreciated that the location of the isolation mechanisms can be rearranged to produce varying effects in the isolation of the operator platform 12 from the chassis motion and that a variety of isolation mechanisms can be used instead of the embodiment shown in FIGS. 2 and 3A. For example, instead of isolation mechanisms 42, 54 at the front and the rear borders of the operator platform 12, isolation mechanisms may be installed on the left and right borders. The isolation mechanisms are installed at borders of the operator platform meaning that one isolation mechanism spans a segment of the operator platform rather than a point such as a corner of the operator platform. The locations of the isolation mechanisms are not limited strictly to opposing borders of the operator platform although such an arrangement is common in suspension systems and it is also possible to have more than two sets of isolation mechanisms. Moreover, variations of the isolation mechanisms would include a dampening device 61 (not shown) such as a shock absorber mounted inside the telescopic members 44a, 44b or 62a, 62b or a separate dampening device where the dampening device 61 dissipates the kinetic energy from the rising and falling motion of the operator platform 12 by turning it into heat energy through the compression of a hydraulic fluid inside the telescopic members 44a, 44b or 62a, 62b using a piston. Furthermore, a biasing member may be any type of spring such as rubber springs, air springs, leaf springs or torsion springs. The biasing member or the dampening device may also be made of elastomers or other polymeric materials.

As a result of the structure of the isolation mechanisms 42, 54, the operator platform suspension system 40 will operate in the following manner and as can be observed in FIGS. 1, 4A-4C and 5. In the front isolation mechanism 42, the lower end 47b of the isolating member 43 and the rear end 50b of the rotating bar 49 will maintain a fixed position on the chassis 2. In comparison, the upper end 47a of the isolating member 43 whose movement coincides with the front end 50a of the rotating bar 49 will move relative to the chassis 2 depending on the position of the operator platform 12. The telescopic members 44a, 44b will react to the movement of the operator platform 12 by sliding against each other and changing the overall length of the isolating member 43. The upper end 47a of the isolating member 43 will rotate about the lower end 47b of the isolating member 43 while also changing the distance from the lower end 47b. However, the upper end 47a of the isolating member 43 will rotate about the rear end 50b of the rotating bar 49 while maintaining a fixed distance from the rear end 50b. In the rear isolation mechanism 54, the lower end 57b of the biasing member 56, secured to the chassis 2 in the present embodiment, will maintain a fixed position on the chassis 2 while the upper end 57a of the biasing member 56 moves freely relative to the lower surface of the operator platform 12 since it is simply in contact with the lower surface. As to the stabilizer bar 60, the outer end 63b will maintain a fixed position on the chassis 2 while the inner end 63a moves vertically as the protrusion 66 rises and falls due to the movement of the operator platform 12. This will cause the telescopic members 62a, 62b to slide against each other and adjust the overall length of the stabilizer bar 60. The stabilizer bar 60 will also adjust to the minimal horizontal movement of the protrusion 66 arising when the front end 50a of the rotating bar 49 rotates about the rear end 50b of the rotating bar 49 and the general plane of the operator platform 12 tilts.

Figure 4A:
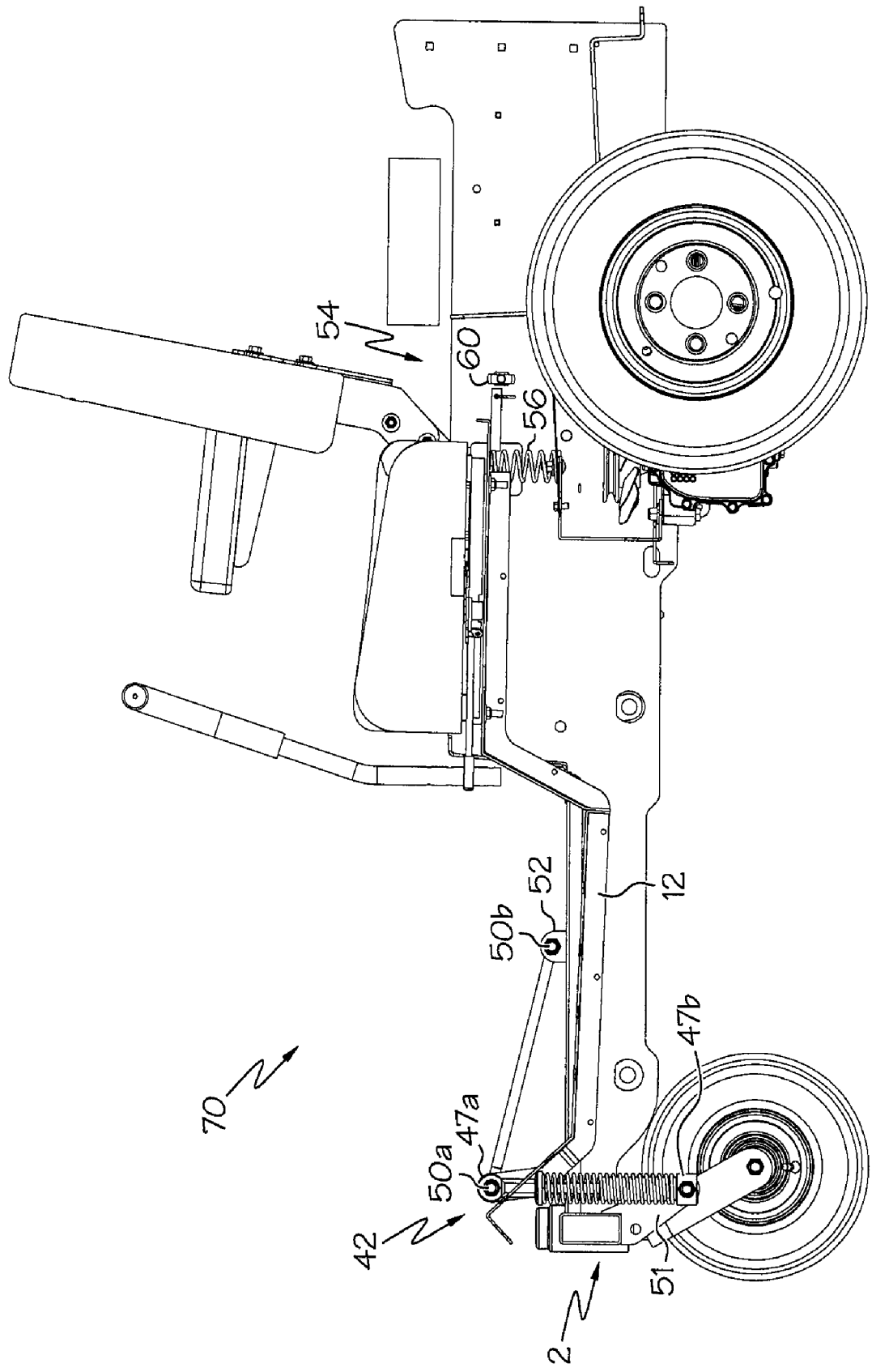
FIG. 4A is a side view of the operator platform isolation system as part of one embodiment of the present invention in a level position.
Figure 4B:
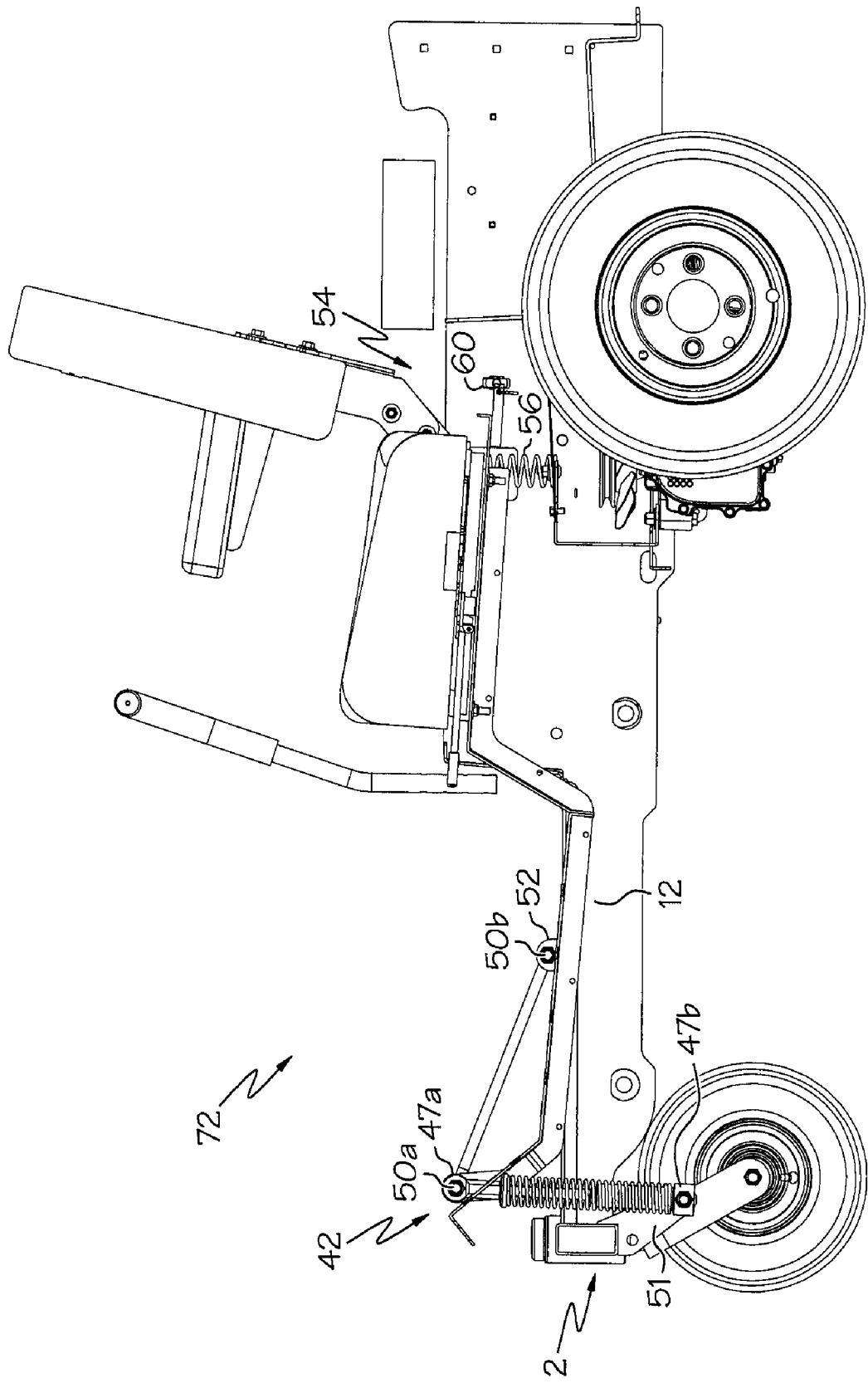
FIG. 4B is a side view of the operator platform isolation system as part of one embodiment of the present invention in an incline position.
Figure 4C:
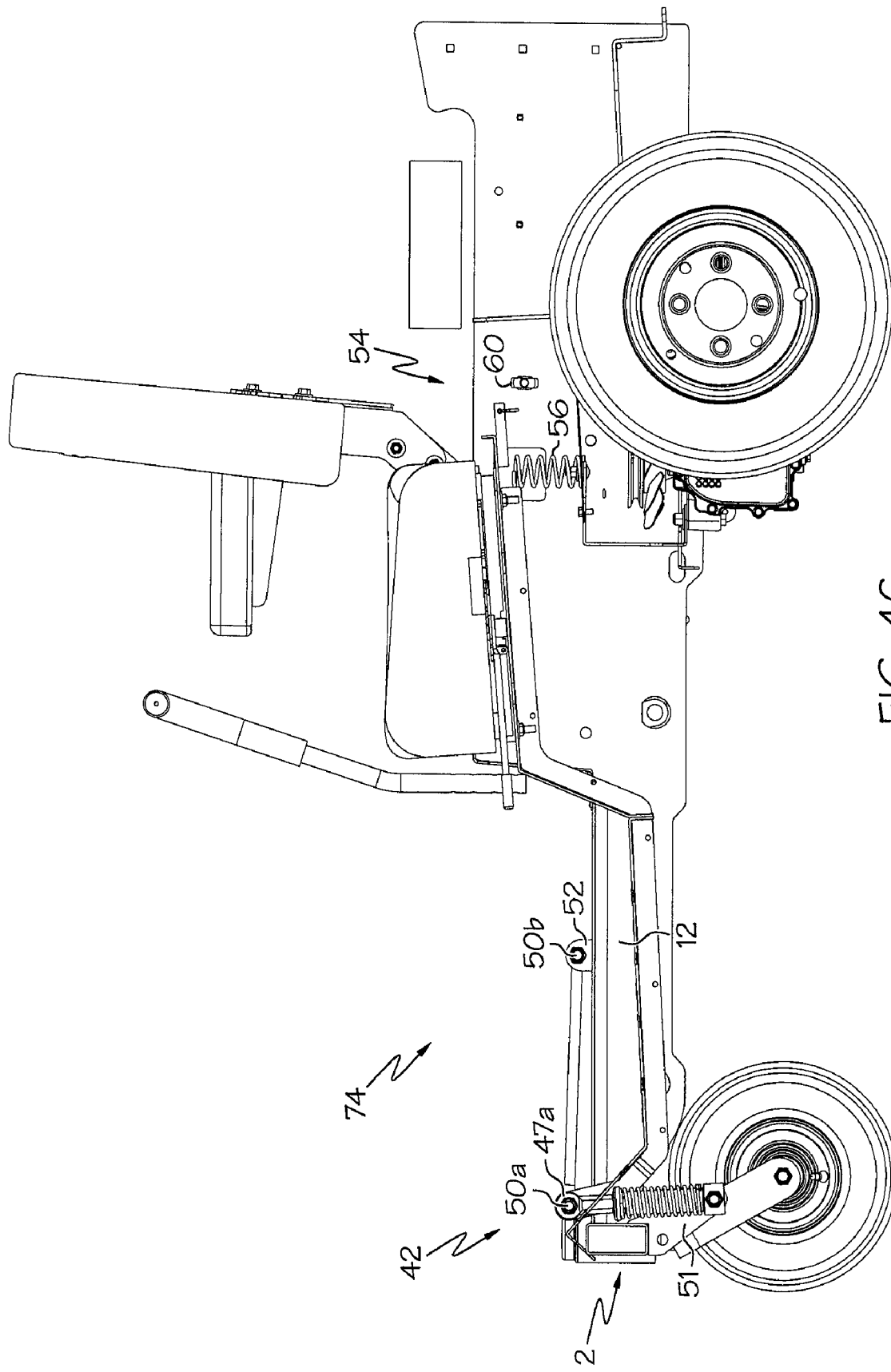
FIG. 4C is a side view of the operator platform isolation system as part of one embodiment of the present invention in a decline position.
Figure 5:
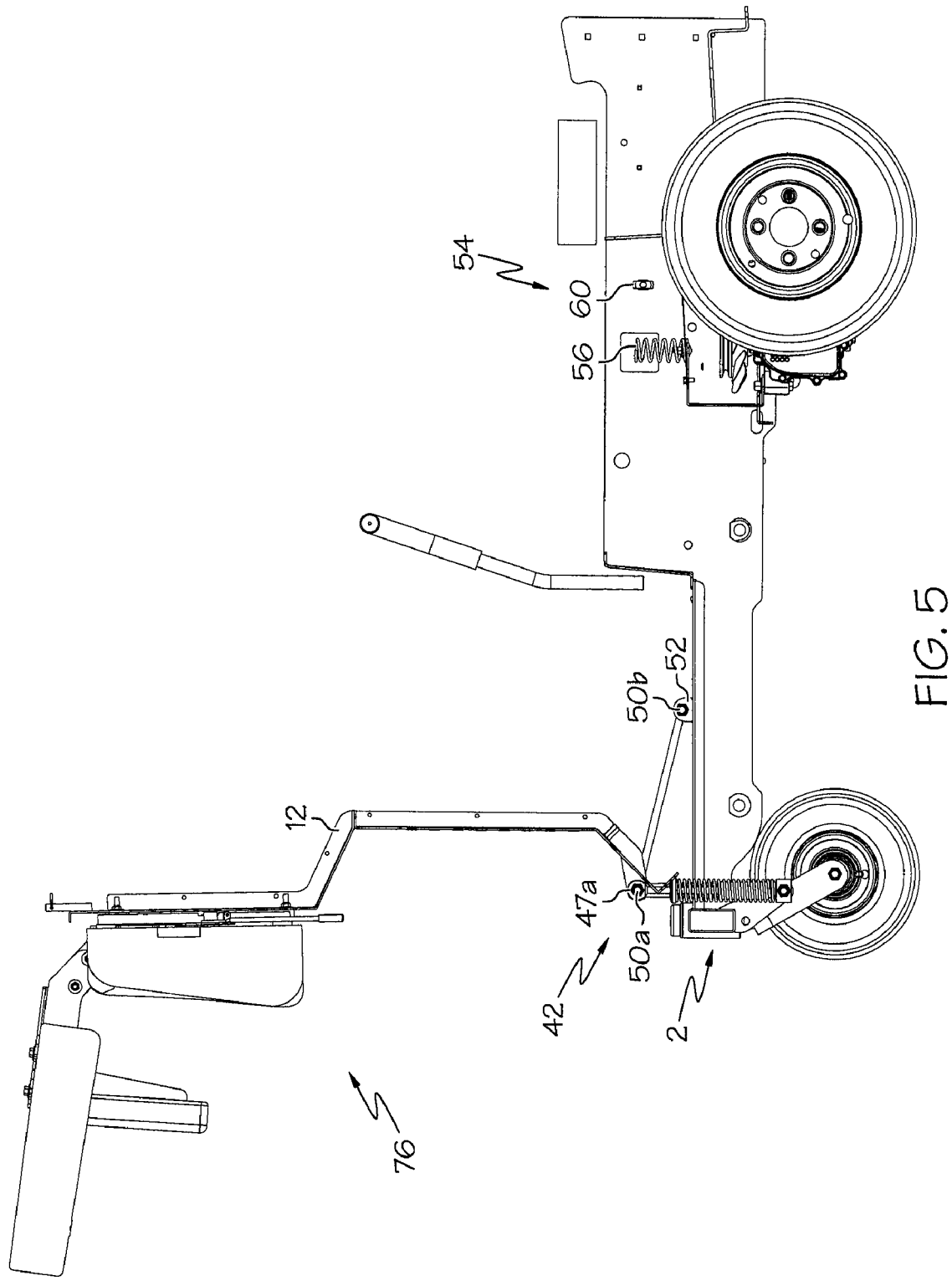
FIG. 5 is a side view of the operator platform isolation system as part of one embodiment of the present invention in a raised position.

FIGS. 4A, 4B and 4C show examples of the various positions of the operator platform isolation system 40 in operation. FIG. 4A shows the operator platform 12 in a level position 70 relative to the chassis 2. This is the default position for the operator platform 12 and another example of the operator platform 12 in the level position 70 is when the mower 1 is traveling at constant speed on an ideally flat surface. FIG. 4B shows the operator platform 12 in an incline position 72 relative to the chassis 2 where the rear of the operator platform 12 is lower than in the level position 70 and a seated operator becomes closer to a supine position than in the level position 70. An example of the operator platform 12 in the incline position 72 is when the rear wheels 6 of the mower 1 encounter a bump or when the mower 1 undergoes acceleration. FIG. 4C shows the operator platform 12 in a decline position 74 relative to the chassis 2 where the front of the operator platform 12 is lower than in the level position 70 and a seated operator becomes closer to a prone position than in the level position 70. An example of the operator platform 12 in the decline position 74 is when the front wheels 4 of the mower 1 encounter a bump or when the mower 1 undergoes deceleration.

FIG. 5 shows the operator platform 12 in a raised position 76. The pivotal coupling of the front isolation mechanism 42 allows the operator platform 12 to be rotatably lifted and provides easier access to components below or behind the operator seat 14. The steering levers 22 must be removed from the path of the rotating operator platform 12 and the inner end 63a of the stabilizer bar 60 must also be disconnected from the protrusion 66 of the operator platform 12 before the operator platform 12 is lifted. The possibility of lifting the operator platform 12 enables having storage space such as a trunk underneath the operator seat 14 and facilitates access to the engine 1 in case of maintenance activities.

Figure 6:
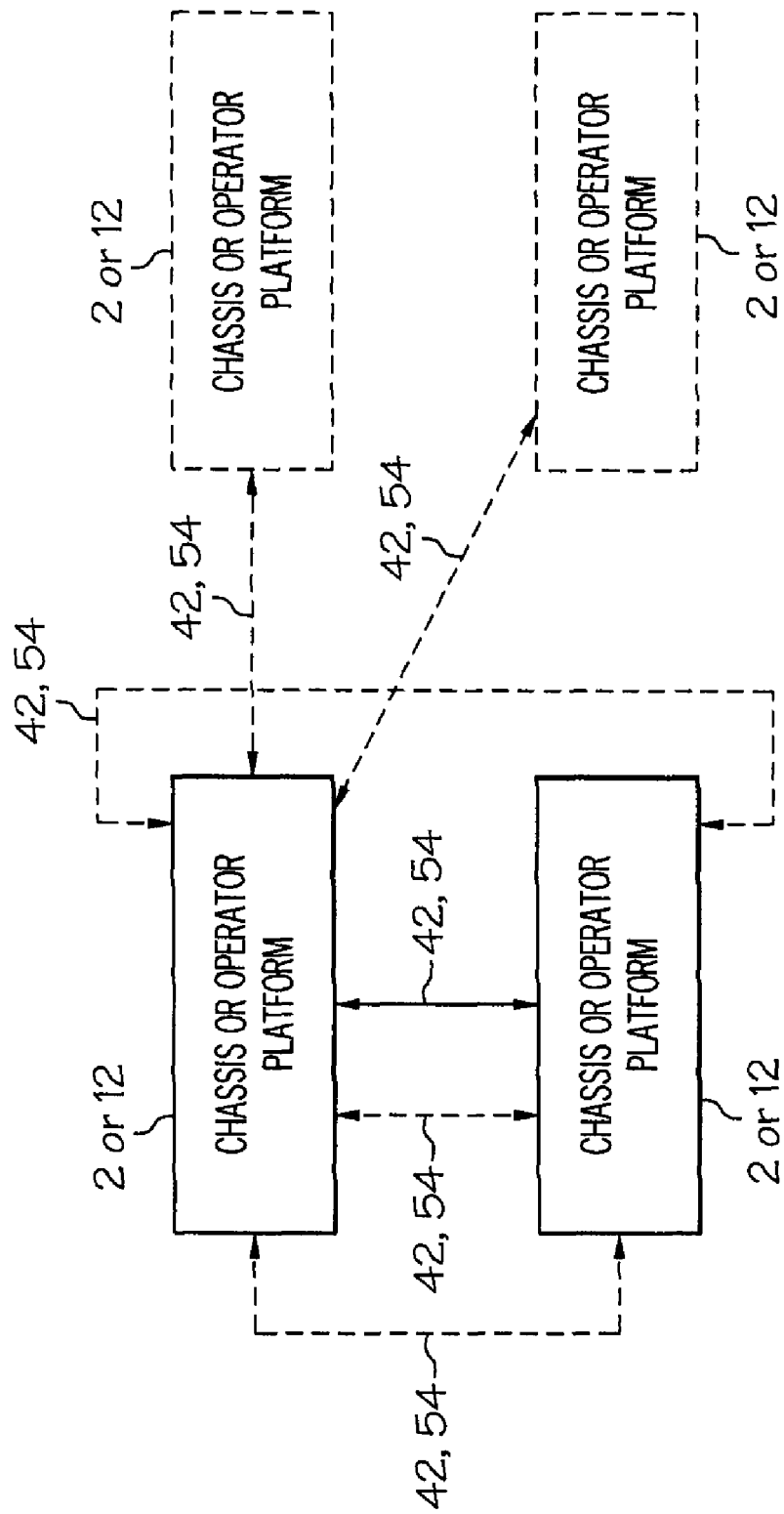
FIG. 6 is a schematic view of the various positional relationships of a chassis, the operator platform and the isolation mechanism.

FIG. 6 shows examples of the variety of positional relationships that can be established between the chassis 2 and the operator platform 12 and, in addition, the positional relationships of the isolation mechanisms 42, 54 in relation to the chassis 2 and the operator platform 12. It is to be appreciated that the isolation mechanisms 42, 54 in FIG. 6 can represent any possible combination of telescopic member, biasing members, dampening device or any other means of isolating the operator platform 12 from motion of the chassis 2. It is possible for the operator platform 12 to be above, below or level with the chassis 2. Moreover, it is possible for the isolation mechanisms 42, 54 to occupy other than the space directly between the chassis 2 and the operator platform 12. It is also possible for the isolation mechanisms 42, 54 to be indirectly connected to the operator platform 12 or the chassis 2 via certain linkage arrangements. The various positions of the isolation mechanisms 42, 54 illustrate the fact that the operator platform 12 can be isolated from the motion of the chassis 2 in a way that the isolation mechanisms 42, 54 operate at various angles, i.e., vertical, non-vertical or even horizontal.

Figure 7:
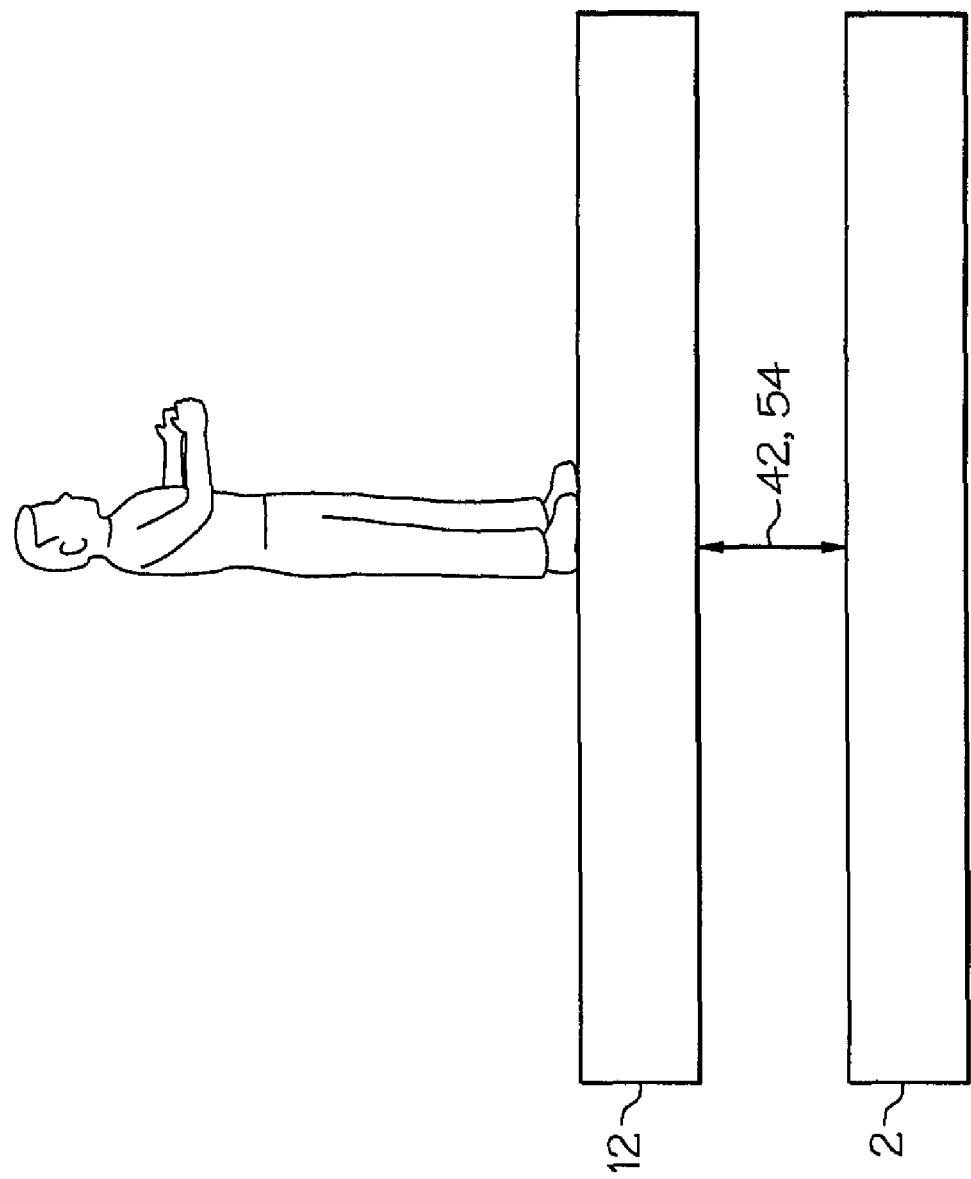
FIG. 7 is a schematic view of an operator standing on the operator platform.

FIG. 7 illustrates an embodiment of the mower 1 in which an operator is in a standing position on top of the mower 1 rather than a seated position. The mower on which the operator can stand may accommodate both a seated position and a standing position or may accommodate only a standing position.

The main benefit of the operator platform isolation system 40 is that it allows the operator platform 12 to float separately from the chassis 2 and, as a result, the operator platform 12 is further isolated from the motion of the chassis 2 even if the chassis 2 is equipped with a separate suspension system. The motion of the chassis 2 that would have directly been transmitted to the operator platform 12 is further absorbed by the operator platform isolation system 40. The present invention also enables a suspension system using springs that are relatively weaker than those for a suspension system connecting the wheels 4, 6 with the chassis 2 because the suspension system does not need to bear the additional weight of the chassis 2. Moreover, the present invention is an improvement over a suspension system that simply spans the base of the operator seat because a seat suspension generally uses a simple pivot mechanism, that is devoid of an isolation mechanism comparable to the present invention, through which the chassis motion can be transmitted and further because the operator, despite the seat suspension, can experience the chassis motion through his or her feet that are in contact with the chassis 2. In comparison, the present invention better isolates the operator's body from the chassis motion.

What is claimed:

1. A vehicle for terrain travel comprising:
   a chassis;
   an operator platform including space for footing;
   a first isolation mechanism and a second isolation mechanism operably connected between the chassis and the operator platform, the isolation mechanisms to be placed at substantially opposite, front and rear borders of the operator platform, and
   at least one rotating bar, an upper end of the first isolation mechanism being pivotally coupled to the operator platform through the at least one rotating bar,
   wherein each isolation mechanism at least partially absorbs motion from the chassis and at least one of the isolation mechanisms couples the operator platform to the chassis.

2. The vehicle of claim 1, wherein the operator platform is further for mounting an operator seat.

3. The vehicle of claim 2, wherein the operator seat is further isolated from motion of the operator platform.

4. The vehicle of claim 1, the operator platform providing room for the operator to stand.

5. The vehicle of claim 1, wherein the operator platform is either below, above or level with the chassis.

6. The vehicle of claim 1, wherein at least one of the isolation mechanisms includes a dampening device.

7. The vehicle of claim 1, wherein at least one of the isolation mechanisms causes a point on the operator platform to move at a fixed distance about the chassis.

8. The vehicle of claim 1, wherein the isolating member of at least one of the isolation mechanisms absorbs the chassis motion at a substantially non-vertical angle.

9. The vehicle of claim 1, at least one of the isolation mechanisms provides for a compressed position and an uncompressed position.

10. The vehicle of claim 1, wherein the vehicle is a riding mower.

11. The vehicle of claim 1, wherein the isolation mechanisms include a plurality of biasing members in a substantially linear configuration.

12. The vehicle of claim 1, wherein the operator platform is not substantially planar.

13. The vehicle of claim 1, wherein the isolation mechanisms indirectly attach to the chassis or the operator platform through linkage arrangements.

14. A vehicle for terrain travel comprising:
    a chassis;
    an operator platform including space for footing; and
    a first isolation mechanism and a second isolation mechanism operably connected between the chassis and the operator platform, the isolation mechanisms to be placed at substantially opposite, front and rear borders of the operator platform,
    wherein each isolation mechanism at least partially absorbs motion from the chassis and at least one of the isolation mechanisms couples the operator platform to the chassis, and at least one of the isolation mechanisms includes a plurality of telescopic members and a biasing member that intervenes with the telescopic members.

15. The vehicle of claim 14, wherein at least one of the isolation mechanisms further includes a dampening device that intervenes with the telescopic members.

16. A vehicle for terrain travel comprising:
    a chassis;
    an operator platform including space for footing; and
    a first isolation mechanism and a second isolation mechanism operably connected between the chassis and the operator platform, the isolation mechanisms to be placed at substantially opposite, front and rear borders of the operator platform,
    wherein each isolation mechanism at least partially absorbs motion from the chassis and at least one of the isolation mechanisms couples the operator platform to the chassis, and at least one of the isolation mechanisms includes a plurality of telescopic members and a dampening device that intervenes with the telescopic members.

17. The vehicle of claim 16, wherein at least one of the isolation mechanisms further includes a biasing member that does not intervene with the telescopic members.

18. A vehicle for terrain travel comprising:
    a chassis;
    an operator platform including space for footing;
    a first isolation mechanism and a second isolation mechanism operably connected between the chassis and the operator platform, the isolation mechanisms to be placed either below, above or level with the platform and at substantially opposite borders of the operator platform, and
    a stabilizer bar extending between the chassis and the operator platform,
    wherein each isolation mechanism at least partially absorbs vertical motion from the chassis and at least one of the isolation mechanisms couples the operator platform to the chassis and at least one of the isolation mechanisms includes a biasing member, and the first isolation mechanism is located at a front border of the operator platform and the second isolation mechanism is located at a rear border of the operator platform, and the stabilizer bar can change its length and adjust to the vertical and horizontal movement of the operator platform.

19. A vehicle for terrain travel comprising:
    a chassis;
    an operator platform including space for footing; and
    a first isolation mechanism and a second isolation mechanism operably connected between the chassis and the operator platform, the isolation mechanisms to be placed either below, above or level with the platform and at substantially opposite borders of the operator platform,
    wherein each isolation mechanism at least partially absorbs motion from the chassis and at least one of the isolation mechanisms couples the operator platform to the chassis and at least one of the isolation mechanisms pivotally couples the operator platform to the chassis so that the operator platform can be rotatably lifted.

20. A vehicle for terrain travel comprising:
a chassis;
an operator platform; and
an isolation mechanism operably connected between the chassis and the operator platform, the isolation mechanism placed near one edge of the operator platform, the isolation mechanism performing the dual functions of pivotally coupling the operator platform to the chassis and at least partially absorbing motion from the chassis.

* * * * *